UNITED STATES PATENT OFFICE 2,599,922

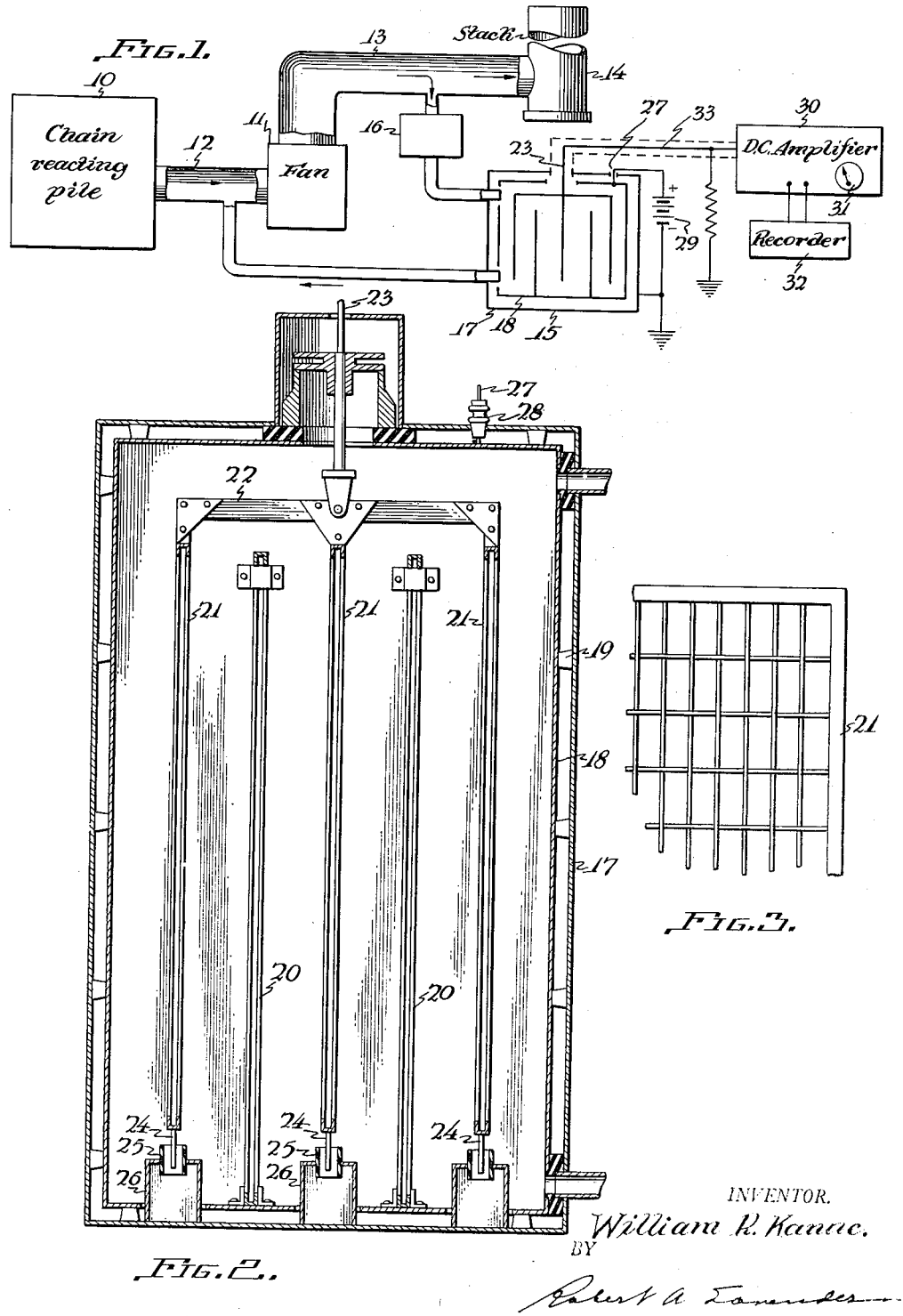

MONITORING OF GAS FOR RADIOACTIVITY

William Rudolph Kanne, Richland, Wash., assignor to the United States of America as represented by the United States Atomic Energy Commission Application October 12, 1944, Serial No. 558,450

9 Claims. (Cl. 250—83.6)

The present invention relates to the checking of a gas for radioactivity and more particularly to the monitoring of cooling air discharged from a chain reacting pile.

In a pile in which uranium encased in sealed jackets is suitably arranged in a graphite matrix to form a carbon-uranium lattice so that neutrons released by natural fission cause additional fissions thereby setting up a chain reaction, a large amount of heat is produced and it is desirable and necessary to remove such heat if the pile is operated at a high wattage. When air is circulated through the pile to carry off excess heat some of its constituents, especially argon, become radioactive while passing through the pile. This activated air, when released to the atmosphere, endangers animal life in the vicinity if the radioactivity is too great. Although the danger from radioactive air is real, the serious danger is that one or more of the jackets may fail and thus release into the cooling air fission products which are intensely radioactive and have long half lives.

An object of the invention is to provide a method and apparatus for continuously determining the activity of the cooling air discharged from a chain reacting pile.

Another object of the invention is the provision of an ionization chamber which is so constructed as to provide a large field strength to voltage ratio.

Another object of the invention is to provide an ionization chamber having very open mesh screen electrodes so as to permit the largest possible paths in the chamber for beta rays.

Other objects and advantages of the invention will become apparent from the following description when read in connection with the accompanying drawing and its scope will be pointed out in the appended claims.

The primary function of a monitoring system for the cooling gas is to obtain a record of the radioactivity disposed of by the pile stack and to give warning of any excessive rise in this activity.

In the drawing:

Fig. 1 is a conventionalized showing of a pile system incorporating the invention, Fig. 2 is a sectional view of the preferred form of the ionization chamber, and Fig. 3 is a fragmentary view of one of the mesh screen electrodes.

As shown in Fig. 1, a chain reacting pile 10 is cooled by a suitable fan 11 which draws air from the pile 10 through a conduit 12 and discharges it to the atmosphere through a conduit 13 and a stack 14. This air in passing through the pile 10 is exposed to neutron bombardment which results in the formation of radioactive nitrogen, oxygen and argon as follows:

$$_7N^{15}+_0n^1 \rightarrow {_7N^{16}} \rightarrow {_8O^{16}}+\beta \quad \text{seconds} \quad 8$$
$$_8O^{18}+_0n^1 \rightarrow {_8O^{19}} \rightarrow {_9F^{19}}+\beta \quad \text{do} \quad 31$$
$$_{18}A^{40}+_0n^1 \rightarrow {_{18}A^{41}} \rightarrow {_{19}K^{41}}+\beta \quad \text{minutes} \quad 110$$

Half life

The isotopes of nitrogen and oxygen which become radioactive comprise a small percentage of the total volume and their half lives are so short that they present no problem with respect to contamination of the atmosphere.

Substantially all of the argon content of air consists of the isotope which becomes radioactive and inasmuch as its half life is nearly two hours it is evident that the intensity of the beta and gamma radiations it gives off should be known, to say the least. For this purpose a known proportion of the air being discharged is passed through an ionization chamber 15 which detects the beta ray activity of the air and preferably records it for historical purposes.

The gamma radiation in the pile 10 will produce a considerable amount of ionization in the air which could contribute a considerable current in the chamber 15. It is preferred to remove such ions prior to the air entering the chamber 15 and this may be accomplished by passing the air through an electrostatic precipitator 16 operating without producing corona. Much of the ordinary dust in the air is charged by the ionization due to gamma radiation so that it will also be removed by the precipitator 16.

The portion of the air being measured for activity may be caused to pass through the chamber 15 in any suitable manner and one convenient way is shown which utilizes the pressure difference across the fan 11.

The precipitator 16 and the chamber 15 are connected in series in a path between the conduit 13 and the conduit 12. The conduit 13 being on the high pressure side of the fan 11, air will flow as indicated in Fig. 1 from the conduit 13 through the precipitator 16, the chamber 15 and return to the system in the conduit 12.

The ionization chamber 15, which is shown in greater structural detail in Fig. 2, must be capable of supplying a current large enough to be reliably measured and should be so constructed as to give the largest field strengths reasonably possible for a definite voltage in order that the necessary voltage does not become too great. A satisfactory form for the chamber 15 comprises an outer wall 17, which is grounded to serve as a safety shield, an inner wall 18 suitably insulated from the wall 17, as by stand-off insulators 19, electrodes 20 carried by and electrically integral with the inner wall 18, and collecting electrodes 21 which are carried by a crossarm 22 in depending relation to an insulated terminal 23. The electrodes 21 hang freely and to prevent abnormal swinging their lower edges may be provided with suitable projections 24 adapted to extend into hollow insulators 25 held in fixed positions by supports 26 carried by the bottom of the outer wall 17.

The electrodes 20 and 21 are of the parallel plate type to obtain a large field strength to voltage ratio and are of very open mesh screen as shown in Fig. 3 to permit the beta rays to have the largest possible path in the chamber. The size of the mesh screen is not critical, but it has been found that a mesh of about three square inches is quite satisfactory for a chamber having a volume of about thirty-five cubic feet. The inner wall 18 serves as additional chamber plates and is provided with a lead 27 extending through an insulator 28 mounted in the outer wall 17. As shown in Fig. 1, the lead 27 is connected to a suitable source of voltage 29, preferably a battery, to charge the inner wall 18 and the electrodes 20 to a high positive potential. The potential to be employed will differ for different chambers, but it should be well above the saturation voltage. The chamber here described saturates at about 90 volts and is generally operated with an applied potential of about 135 volts.

The terminal 23 for the collecting electrodes 21 is connected by a shielded lead 33 to a high impedance D. C. amplifier 30 having a meter 31 to indicate the current collected and hence the activity of the air passing through the chamber 15. A recording device 32 may be connected in series with the meter 31 to provide for ready reference a history of the activity discharged to the atmosphere.

It will be appreciated that the system described above, in giving a measure of the activity of the cooling air, automatically gives thereby an indication of the power level at which the pile is operating. This is true for the reason that the activity of the air is a function of its bombardment by neutrons and the neutron intensity is a function of the pile power level. Calibration of the air activity measurement in terms of pile wattage depends upon several factors such as the volume of air per unit time i. e., the period the air is exposed to neutrons in the pile, and the path of the air through the pile. However, the manner in which any particular pile can be calibrated will be obvious to one skilled in the art.

For the purpose of describing the invention reference has been had to a specific embodiment thereof, but it is to be understood that the invention may take other forms and that many modifications may be made without departing from the invention the scope of which is pointed out in the appended claims.

I claim:

1. An ionization chamber for use in measuring beta ray activity of a gas passing therethrough comprising a container having spaced inner and outer walls insulated from each other, entrance and exit openings through said walls for the flow of a gas therethrough, a terminal mounted in and insulated from the top walls of said container, a plurality of flat open mesh electrodes arranged in spaced parallel relation within said container, alternate electrodes being secured electrically and mechanically to said inner wall and to said terminal, respectively, whereby relatively long paths are provided for beta rays given off by the gas in the container and a large field strength to voltage ratio is obtainable, a direct current voltage source having the negative end thereof connected to ground and to the outer walls of said chamber and the positive end thereof connected through an insulator to the inner walls of said chamber, and an electrical connection, including a resistance element, between ground and said terminal.

2. An ionization chamber for determining the beta ray activity of a gas flowing through the chamber, comprising two sets of interleaving electrodes adapted to form a plurality of electrostatic fields when an electric potential is impressed across them, characterized by said electrodes being arranged in spaced parallel planes and having an open mesh structure permitting free circulation of the gas and providing relatively long paths for the beta rays given off by the gas, the mesh of said electrode structure being in the order of three square inches.

3. An ionization chamber for determining the beta ray activity of a gas flowing through the chamber, comprising two sets of interleaving electrodes adapted to form a plurality of electrostatic fields when an electric potential is impressed across them, characterized by said electrodes being arranged in spaced parallel planes and having an open mesh structure permitting free circulation of the gas and providing relatively long paths for the beta rays given off by the gas, said interleaving electrodes being separated by a distance which is substantially less than the range of beta rays in said gas.

4. An ionization chamber for determining the beta ray activity of a gas flowing through the chamber, comprising two sets of interleaving electrodes adapted to form a plurality of electrostatic fields when an electric potential is impressed across them, characterized by said electrodes being arranged in spaced parallel planes and having an open mesh structure permitting free circulation of the gas and providing relatively long paths for the beta rays given off by the gas, the mesh of said electrode structure being in the order of three square inches, said interleaving electrodes being separated by a distance which is substantially less than the range of beta days in said gas.

5. An ionization chamber for use in measuring beta ray activity of a gas passing therethrough, comprising a container having spaced inner and outer walls insulated from each other, entrance and exit openings through said walls for the flow of a gas therethrough, a terminal mounted in and insulated from the top walls of said container, and a plurality of flat mesh electrodes arranged in spaced parallel relation within said container, the mesh of said electrode structure being in the order of three square inches, alternate electrodes being secured electrically and mechanically to said inner wall and to said terminal, respectively, whereby relatively long paths are provided for beta rays given off by the gas in the container and a large field strength to voltage ratio is obtainable.

6. An ionization chamber for use in measuring beta ray activity of a gas passing therethrough, comprising a container having spaced inner and outer walls insulated from each other, entrance and exit openings through said walls for the flow of a gas therethrough, a terminal mounted in and insulated from the top walls of said container, and a plurality of flat mesh electrodes arranged in spaced parallel relation within said container, alternate electrodes being secured electrically and mechanically to said inner wall and to said terminal, respectively, said electrodes being separated by a distance which is substantially less than the range of beta rays in said gas, whereby relatively long paths are provided for beta rays given off by the gas in the container and a large field strength to voltage ratio is obtainable.

7. An ionization chamber for use in measuring beta ray activity of a gas passing therethrough, comprising a container having spaced inner and outer walls insulated from each other, entrance and exit openings through said walls for the flow of a gas therethrough, a terminal mounted in and insulated from the top walls of said container, and a plurality of flat mesh electrodes arranged in spaced parallel relation within said container, the mesh of said electrode structure being in the order of three square inches, alternate electrodes being secured electrically and mechanically to said inner wall and to said terminal, respectively, said electrodes being separated by a distance which is substantially less than the range of beta rays in said gas, whereby relatively long paths are provided for beta rays given off by the gas in the container and a large field strength to voltage ratio is obtainable.

8. An ionization chamber for determining the radioactivity of a gas, comprising two sets of interleaving electrodes adapted to form a plurality of electrostatic fields when an electric potential is impressed across them, said electrodes being arranged in spaced parallel planes and having an open mesh structure permitting free circulation of the gas and providing relatively long paths for the particles emitted by the radioactive gas, said interleaving electrodes being separated by a distance which is substantially less than the range in said gas of the particles emitted by said gas.

9. An ionization chamber for use in measuring the radioactivity of a gas passing therethrough, comprising a container having spaced inner and outer walls insulated from each other, entrance and exit openings through said walls for the flow of gas therethrough, a terminal mounted in and insulated from the top walls of said container, and a plurality of flat, open mesh electrodes arranged in spaced parallel relation within said container, alternate electrodes being secured electrically and mechanically to said inner wall and to said terminal, respectively, said electrodes being separated by a distance which is substantially less than the range in said gas of the particles emitted by said gas, whereby relatively long paths are provided for the particles emitted by the gas in the container and at the same time a large field strength to voltage ratio is obtainable.

WILLIAM RUDOLPH KANNE.

REFERENCES CITED

The following references are of record in the file of this patent:

UNITED STATES PATENTS

| Number | Name | Date |
| --- | --- | --- |
| 1,808,709 | Blake | June 2, 1931 |
| 2,197,453 | Hassler | Apr. 16, 1940 |
| 2,264,725 | Shoupp | Dec. 2, 1941 |
| 2,288,718 | Kallmann | July 7, 1942 |
| 2,349,753 | Pontecorvo | May 23, 1944 |

FOREIGN PATENTS

| Number | Country | Date |
| --- | --- | --- |
| 18,827 | Great Britain | 1913 |